J. H. BRIGHT.
FOLDING BOW FOR VEHICLE TOPS.
APPLICATION FILED NOV. 29, 1913.
1,101,903.
Patented June 30, 1914.
2 SHEETS—SHEET 1.
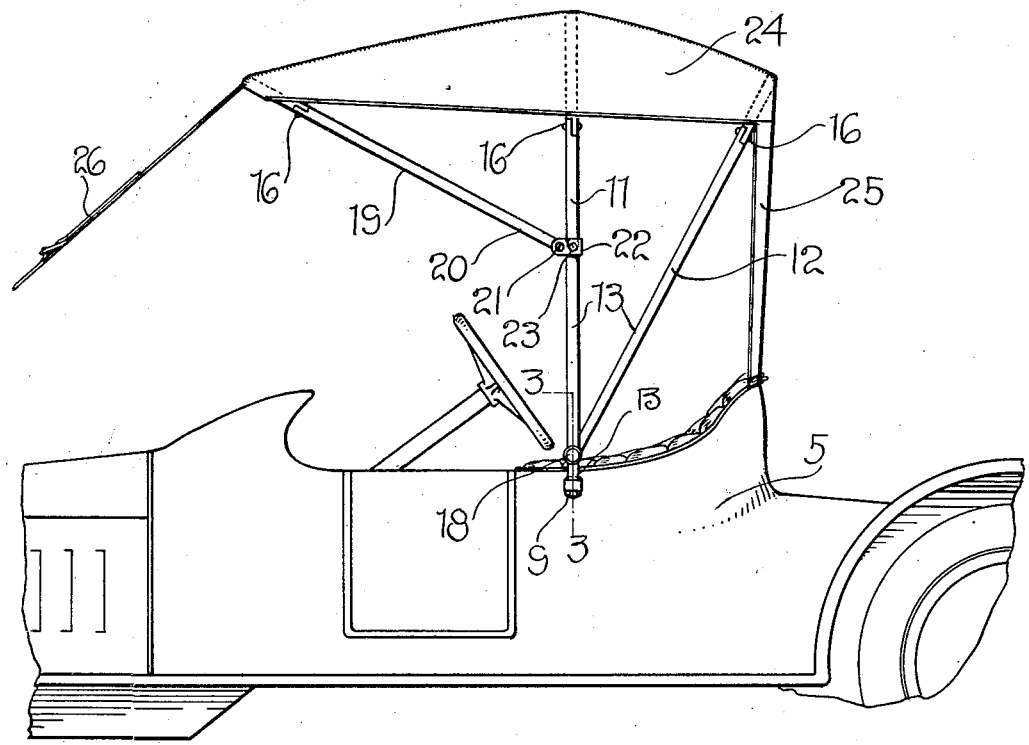
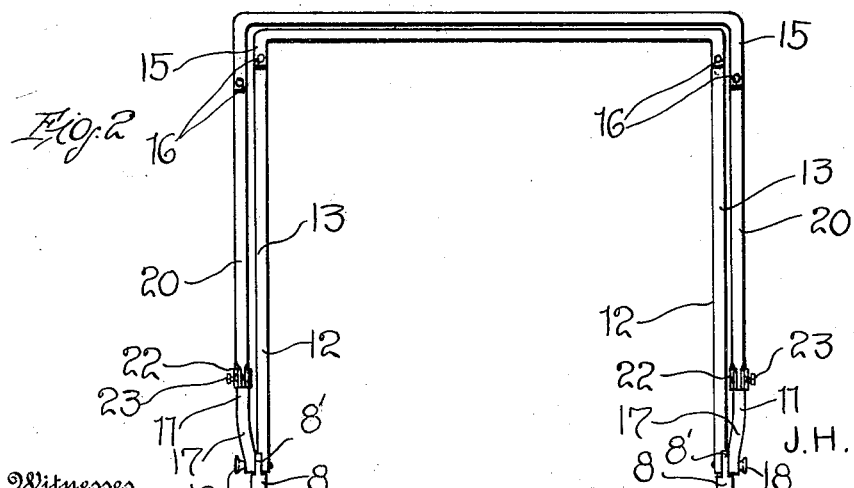
Witnesses
Robert M. Sutphen
A. J. Hurd
Inventor
J. H. Bright
By Watson E. Coleman
Attorney

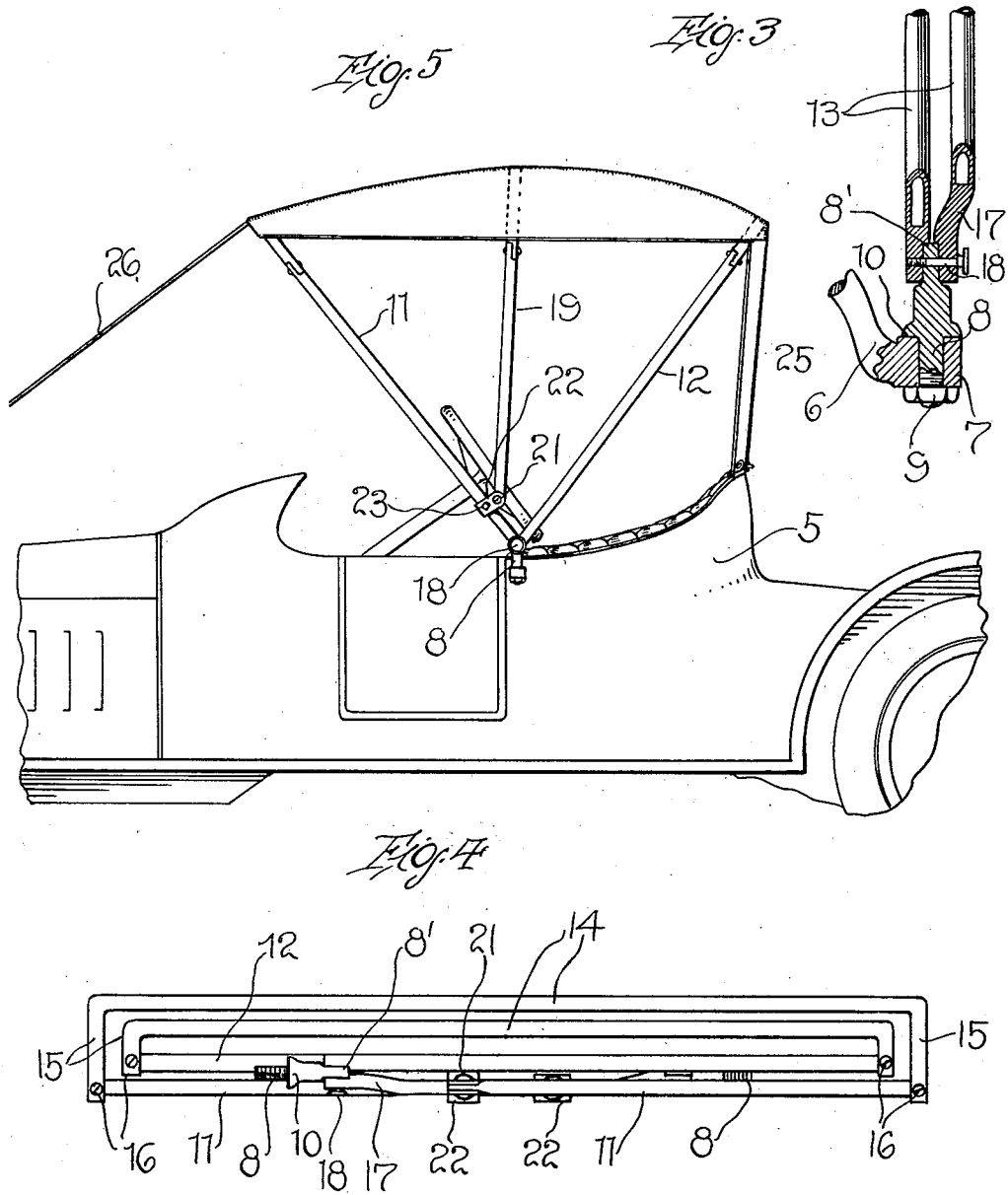

UNITED STATES PATENT OFFICE.

JAMES H. BRIGHT, OF HOUSTON, TEXAS.

FOLDING BOW FOR VEHICLE-TOPS.

1,101,903.   Specification of Letters Patent.   Patented June 30, 1914.

Application filed November 29, 1913. Serial No. 803,837.

*To all whom it may concern:*

Be it known that I, JAMES H. BRIGHT, citizen of the United States, residing at Houston, in the county of Harris and State of Texas, have invented certain new and useful Improvements in Folding Bows for Vehicle-Tops, of which the following is a specification, reference being had to the accompanying drawings.

This invention relates to vehicle tops of that character wherein a plurality of bows are provided upon which a suitable cover is permanently or removably secured, and the invention has for its principal object to provide a device of this character wherein the bows may be compactly folded so that the same can be carried in a comparatively restricted space upon the body of the vehicle.

In its more specific aspect, the invention embodies improved means for removably mounting the top upon the body of the vehicle, said top including a pair of bows having common supporting pivots mounted upon the vehicle body, and a third bow pivotally and adjustably mounted at its extremities upon one of the first named bows, and constituting a tensioning member whereby the cover is maintained in a taut or stretched condition.

My invention has for a further object to produce a device of the above character which is very simple as well as strong and durable in construction, may be manufactured at small cost and is highly convenient and serviceable in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation showing my improved top mounted upon the body of a motor vehicle, and illustrating one arrangement of the bows; Fig. 2 is a front elevation, the bows being partly folded; Fig. 3 is a section taken on the line 3—3 of Fig. 1; Fig. 4 is a view similar to Fig. 2, the bows being completely folded; Fig. 5 is a view similar to Fig. 1 illustrating a different arrangement of the bows.

Referring in detail to the drawings, 5 designates the seat of a vehicle body upon each side of which a bracket arm 6 is mounted. This bracket arm at one end terminates in a sleeve 7, and in said sleeves, the supporting rods or bolts 8 are removably secured, suitable clamping nuts 9 being threaded upon the lower ends of said bolts. The bolts 8 at their upper ends are provided with annular shoulders 10 which rest upon the sleeves 7.

My improved vehicle top includes a frame structure which consists of the bows 11 and 12, each of said bows embodying side arms 13, and an intermediate section 14 to the curved ends 15 of which said side arms are pivotally connected as indicated at 16. It will be noted that the bow 11 is slightly larger than the bow 12 so that when said bows are disposed in the same plane, as shown in Fig. 2, the bow 11 will be disposed outwardly of and in spaced relation to the bow 12. Each of the bow sections is preferably constructed of a tubular metal rod, though of course, it will be understood that the present invention is not limited in this respect. The ends of the arms or sections 13 of the bow 11 are offset as at 17. Between these offset ends of the bow 11 and the corresponding ends of the bow 12, the upper reduced end 8′ of the supporting bolts 8 are disposed. Pins 18 are arranged in the ends of the bow arms and loosely mounted in openings provided in the reduced ends of the supporting bolts.

In addition to the main bows 11 and 12, I also provide a supplementary or additional bow 19, which is of similar construction to the other bows above described. The side arms or sections 20 of this latter bow are pivotally mounted as at 21 upon the sleeves 22 which are slidably engaged upon the side arms 13 of the bow 11. These sleeves carry set screws 23 for binding engagement with the arms 13 whereby the sleeves may be secured in their adjusted positions.

Attention is now directed to Fig. 1 of the drawings wherein I have illustrated one arrangement of the bows whereby a forwardly projecting hood is produced extending in advance of the vehicle seat. In this disposition of the bows, the bow 11 is disposed in substantially perpendicular position while the smaller bow 12 is inclined rearwardly from the common supporting bolts 8 of said bows. After properly adjusting the supplemental bow 19, the same is turned forwardly to an inclined position with relation to the perpendicular bow 11. A cover 24 is preferably detachably secured to the intermediate sections of the several bows by means of straps or other suitable fastenings. It will of course be apparent that as the larger bow 11 is arranged centrally between the bows 12 and 19, the central portion of the cover will be disposed at a higher elevation than the end portions thereof. Suitable straps 25 are attached at one of their ends to the intermediate or central section of the rearwardly extending bow 12 and have their lower ends removably fastened in any preferred manner to the rear upper edge of the seat 5 of the vehicle. Similar straps 26 are also connected to the ends of the central section of the bow 19 and are adapted to be attached to the body of the vehicle in any preferred manner at their opposite ends. Suitable side curtains may also be permanently or removably attached to the edges of the cover 24 and fastened to the seat body at their lower ends in the ordinary way.

In Fig. 5 of the drawings, I have illustrated another arrangement of the top bows which produce a rounding or curved top over the seat. It will be noted that in this instance, the large bow 11 extends forwardly from the supporting bolts 8 while the smaller bow 12 extends rearwardly therefrom. The additional bow 19 now occupies a central perpendicular position and is adapted to be adjusted upon the arms of the bow 11 so as to raise or elevate the central part of the cover to any desired height, so that the arc described by the cover may be varied as desired to cause the cover to extend forwardly over the vehicle seat for the desired distance. It will thus be seen that the arrangement of the top bows may be very easily and quickly adjusted so as to dispose the top in such manner that it will not interfere with the easy entrance to or descent from the vehicle seat, while at the same time ample protection will be afforded thereby. When it is not desired to use the vehicle top, the cover may be removed from the frame bows and the side curtains folded up inside of the body of the cover and said cover compactly folded and stored away. The manner of folding the frame bows will be clearly seen from reference to Figs. 2 and 4 of the drawings. The several bows are first moved toward each other so that they are disposed in contiguous relation as clearly shown in Fig. 2, and the side arms of these bows are then moved inwardly toward and upon each other, the sleeves 21 sliding freely upon the arms of the bow 11. Thus, as shown in Fig. 4, the arms of the several bows and the intermediate sections thereof are very compactly folded. It is of course, understood that before the folding of the side arms, the supporting bolts 8 have been removed from the sleeves 7 of the bracket members 6. These folded bows together with the cover may be bound together by means of the straps 25 and 26, and the entire top thus very compactly arranged so that it can be secured upon the running board of the vehicle or other comparatively restricted space in the body thereof.

From the foregoing, it is thought that the construction, manner of operation and several advantages of my invention will be fully understood. The vehicle top may be very easily and quickly arranged upon the body of the vehicle or removed therefrom when its use is not desired, by simply removing the nuts 9 from the lower ends of the supporting bolts 8 and lifting said bolts from the sleeves of the bearing brackets 6. It will of course, be appreciated that my invention may be applied to the various forms of motor vehicles now in general use and the cover thereof may be of greater length than shown in the drawing, and additional supporting bows provided therefor.

In addition to the arrangements of the bows shown in Figs. 1 and 5 of the drawings, when the device is to be applied to a five or seven passenger automobile, extra bows are provided. The bows 11 and 12 as shown in Fig. 1 of the drawings are employed and a bow of the same construction is also removably mounted upon the forward vehicle seat. Another bow is arranged upon the top of the hood or dash of the vehicle, these additional bows supporting the forwardly extending portion of the top or cover as will be readily understood. It will also be apparent that various other arrangements of the bows may be resorted to.

It will further be understood that many changes may be made in the form, proportion and construction of the several elements employed, as may be necessary to adapt the device to use upon various constructions of vehicles, and I therefore reserve the right to resort to all such legitimate changes as may be fairly embodied within the spirit and scope of the invention as claimed.

Having thus described the invention, what is claimed is:

1. A vehicle top comprising a pair of bows of relatively different sizes, each of said bows consisting of an intermediate section and side arms pivotally connected to the ends of said intermediate section, supporting bolts upon which the corresponding bow arms are pivotally mounted, one of said bows being adapted to fold within the other, and the side arms of the bows being foldable inwardly upon said intermediate sections.

2. A vehicle top comprising a pair of bows of relatively different sizes, each of said bows consisting of an intermediate section and side arms pivoted at one of their ends to the ends of the intermediate section, common supporting bolts upon which the other ends of the corresponding arms of said bows are pivotally mounted, one of said bows being foldable within the other and the side arms of the outer bow being shorter than the arms of the inner bow, whereby when the side arms are folded inwardly upon the intermediate bow sections, said intermediate sections are moved toward each other and closely arranged with respect to said side arms.

3. A vehicle top comprising a pair of bows of relatively different sizes, each of said bows consisting of an intermediate section having its extremities angularly disposed and side arms pivotally connected to the angular ends of said intermediate section, bolts upon which the corresponding bow arms are pivotally mounted, one of said bows being adapted to fold within the other, the angular ends of the intermediate section of the larger bow being of greater length than the angular ends of the intermediate section of the smaller bow and the pivots connecting the ends of said intermediate sections to the side arms being disposed in different vertical and horizontal planes, whereby, when the side arms are folded inwardly upon the intermediate sections, said sections are moved toward each other into compact relation with the side arms.

4. A vehicle top comprising a pair of bows of relatively different sizes, each of said bows consisting of an intermediate section and side arms pivotally connected to the ends of said section, the side arms of the outer bow being shorter than those of the inner bow, supporting bolts upon which the corresponding bow arms are pivotally mounted, and an additional bow also consisting of an intermediate section and the side arms pivotally connected thereto, and means for slidably and adjustably mounting the arms of said latter bow upon the side arms of the larger bow of said pair of bows, whereby all of the side arms may be folded inwardly upon the intermediate sections and said intermediate sections compactly arranged with respect to each other and with respect to said side arms.

In testimony whereof I hereunto affix my signature in the presence of two witnesses.

JAMES H. BRIGHT.

Witnesses:
ALTA G. KNAPP,
C. E. OXFORD.